United States Patent
Westman et al.

(10) Patent No.: US 9,860,074 B2
(45) Date of Patent: Jan. 2, 2018

(54) GROUP COMMUNICATION

(71) Applicant: Conversant Wireless Lecensing S.a.r.l, Luxembourg (LU)

(72) Inventors: Ilkka Westman, Helsinki (FI); Pekka Kuure, Espoo (FI); Tapio Paavonen, Pirkkala (FI); Simo Hyytia, Espoo (FI); Arto Leppisaari, Kangasala (FI)

(73) Assignee: Conversant Wireless Lecensing S.a.r.l, Luxembourg (LU)

(*) Notice: Subject to any disclaimer, the term of this patent is extended or adjusted under 35 U.S.C. 154(b) by 0 days.

(21) Appl. No.: 14/832,091

(22) Filed: Aug. 21, 2015

(65) Prior Publication Data

US 2015/0365243 A1    Dec. 17, 2015

Related U.S. Application Data

(63) Continuation of application No. 11/528,759, filed on Sep. 28, 2006, now Pat. No. 9,154,924.

(30) Foreign Application Priority Data

Jul. 5, 2006 (FI) .................................. 20065479

(51) Int. Cl.
| | |
|---|---|
| *H04L 12/18* | (2006.01) |
| *H04L 29/06* | (2006.01) |
| *H04W 8/18* | (2009.01) |
| *H04W 12/08* | (2009.01) |
| *H04W 4/08* | (2009.01) |
| *H04W 28/18* | (2009.01) |

(Continued)

(52) U.S. Cl.
CPC ........ *H04L 12/1818* (2013.01); *H04L 12/185* (2013.01); *H04L 12/1822* (2013.01); *H04L 63/104* (2013.01); *H04L 65/1006* (2013.01); *H04W 4/08* (2013.01); *H04W 8/186* (2013.01); *H04W 12/08* (2013.01); *H04L 12/189* (2013.01); *H04L 63/101* (2013.01); *H04L 65/403* (2013.01); *H04M 3/56* (2013.01); *H04M 2203/5063* (2013.01); *H04W 28/18* (2013.01); *H04W 48/08* (2013.01); *H04W 76/02* (2013.01)

(58) Field of Classification Search
CPC ..... H04L 12/1818; H04L 12/18; H04L 12/08; H04L 12/1822; H04L 12/185; H04L 12/189; H04L 63/101; H04L 63/104; H04L 65/1006; H04L 65/403; H04W 4/08; H04W 76/02; H04M 3/56; H04M 2203/5063

See application file for complete search history.

(56) References Cited

U.S. PATENT DOCUMENTS

| | | | | |
|---|---|---|---|---|
| 2002/0042814 | A1* | 4/2002 | Fukasawa | G06Q 10/10 709/204 |
| 2002/0056003 | A1* | 5/2002 | Goswami | G06F 9/54 709/227 |

(Continued)

*Primary Examiner* — Jenee Holland
(74) *Attorney, Agent, or Firm* — Conversant Wireless Lecensing (57) ABSTRACT

In order to facilitate group communication using characteristics of a pre-arranged group but not involving all members of the pre-arranged group, a parameter indicating that the group communication is not intended to all members of the pre-arranged group is added by an inviting group member sending a request to a group server, and the group server, in response to the parameter, is configured to not to invite all members to the group communication.

16 Claims, 6 Drawing Sheets

(51) Int. Cl.
*H04W 76/02* (2009.01)
*H04M 3/56* (2006.01)
*H04W 48/08* (2009.01)

(56) References Cited

U.S. PATENT DOCUMENTS

| | | | | |
|---|---|---|---|---|
| 2002/0075303 A1* | 6/2002 | Thompson | G06F 3/0481 | 715/751 |
| 2002/0078150 A1* | 6/2002 | Thompson | G06Q 10/10 | 709/204 |
| 2002/0122391 A1* | 9/2002 | Shalit | H04L 12/1813 | 370/260 |
| 2002/0168992 A1* | 11/2002 | Eiden | H04W 24/00 | 455/505 |
| 2003/0009767 A1* | 1/2003 | Narita | H04L 12/1818 | 725/97 |
| 2003/0065729 A1* | 4/2003 | Leinonen | H04L 12/185 | 709/206 |
| 2004/0003044 A1* | 1/2004 | Teoh | H04L 12/1822 | 709/205 |
| 2004/0054729 A1* | 3/2004 | Fukuizumi | H04L 12/1818 | 709/205 |
| 2004/0064512 A1* | 4/2004 | Arora | H04L 51/04 | 709/206 |
| 2004/0071099 A1* | 4/2004 | Costa-Requena | H04L 12/1818 | 370/260 |
| 2004/0131042 A1* | 7/2004 | Lillie | H04L 12/1822 | 370/351 |
| 2004/0186887 A1* | 9/2004 | Galli | H04L 51/04 | 709/206 |
| 2004/0196978 A1* | 10/2004 | Godfrey | G06Q 10/107 | 380/270 |
| 2004/0221043 A1* | 11/2004 | Su | H04L 12/18 | 709/227 |
| 2004/0246121 A1* | 12/2004 | Beyda | H04L 12/1827 | 340/506 |
| 2004/0260680 A1* | 12/2004 | Best | G06F 17/30867 | |
| 2005/0031109 A1* | 2/2005 | Fernandez | H04L 12/1818 | 379/202.01 |
| 2005/0060220 A1* | 3/2005 | Beringer | G06Q 10/10 | 705/7.33 |
| 2005/0091380 A1* | 4/2005 | Gonen | H04L 12/1818 | 709/227 |
| 2005/0259803 A1* | 11/2005 | Khartabil | H04M 3/564 | 379/202.01 |
| 2005/0260976 A1* | 11/2005 | Khartabil | H04M 3/56 | 455/416 |
| 2005/0267984 A1* | 12/2005 | Costa-Requena | H04L 41/0893 | 709/238 |
| 2006/0031290 A1* | 2/2006 | Mannaru | G06Q 10/10 | 709/204 |
| 2006/0136584 A1* | 6/2006 | Decker | H04L 12/185 | 709/224 |
| 2006/0173940 A1* | 8/2006 | Guntupalli | H04L 12/1818 | |
| 2006/0236247 A1* | 10/2006 | Morita | G06F 19/321 | 715/733 |
| 2006/0265262 A1* | 11/2006 | Kamdar | G06Q 10/109 | 705/80 |
| 2007/0124381 A1* | 5/2007 | Zurko | G06Q 10/10 | 709/205 |
| 2007/0127670 A1* | 6/2007 | Morishima | H04L 12/1818 | 379/202.01 |
| 2007/0208806 A1* | 9/2007 | Mordecai | G06Q 10/10 | 709/204 |
| 2007/0250569 A1* | 10/2007 | Mutikainen | H04L 12/1822 | 709/204 |
| 2007/0271367 A1* | 11/2007 | Yardeni | G06Q 10/107 | 709/223 |
| 2007/0276908 A1* | 11/2007 | Asthana | H04L 12/1822 | 709/204 |
| 2008/0009303 A1* | 1/2008 | Westman | H04L 12/1818 | 455/518 |
| 2008/0040189 A1* | 2/2008 | Tong | G06Q 10/00 | 705/7.13 |
| 2008/0274762 A1* | 11/2008 | Wu | H04W 4/10 | 455/518 |
| 2009/0149208 A1* | 6/2009 | Huttunen | H04W 24/10 | 455/509 |
| 2009/0252178 A1* | 10/2009 | Huttunen | H04W 72/085 | 370/445 |

* cited by examiner

GROUP COMMUNICATION

FIELD OF THE INVENTION

The present invention relates to group communication in communication systems.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

One special feature offered in mobile communication systems is group communication. The term "group", as used herein, refers to any logical group of two or more users intended to participate in the same group communication. Examples of group communication include a conference call and a group call, which is a call in which one or more participants may take turns to speak and to listen to each other.

Conventionally, conference calls between three or more participants established such that each participant calls to a bridge, have been available in public switched communication systems. On the other hand, group communication in which one participant calls to the group and the others are called to has been available only in trunked mobile communication systems, such as Professional Mobile Radio or Private Mobile Radio (PMR) systems, such as TETRA (Terrestrial Trunked Radio), which are special radio systems primarily intended for professional and governmental users. Thanks to the evolution of communication technology, particularly 1P-based communication technology, and end user terminals, more enhanced group communication services are now available also in public mobile communication systems. An example of such a service is Push-to-talk over Cellular (PoC), which allows user voice communications to be shared with a single recipient (1-to-1) or between groups of recipients, as in a group chat session (1-to-many) over mobile networks. The PoC service is implemented such that a PoC server, or a server system, receives voice from one participant in the conversation and sends it to other participants in the session.

The main group types are a pre-arranged group, an ad hoc group or a chat group; other group types are subtypes of the above. A pre-arranged group, sometimes called a pre-defined group, is a group having predefined characteristics and group members, and a server hosting the group invites other group members when a first member joins a group session, i.e. sends, using a URI (uniform resource identifier) of the pre-arranged group, to a server hosting the pre-arranged group, an invitation to the group or a request to establish a session with the group. A chat group differs from the pre-arranged group in such a respect that each member individually joins and leaves the group session, and thereby the server hosting the chat group does not invite other members to join. When a member joins a chat room, he/she sends an invitation to a URI of the chat group. An ad hoc group is a group whose intended participants are selected by a group creator, who sends to a server providing ad-hoc services, indications of participants in a request to establish an ad hoc group session. The request is sent using an URI of the server, or a corresponding service in the server, and the server invites the participants who were indicated in the request to join the session. The ad hoc group does not necessarily have predefined characteristics; they may be negotiated during the group establishment.

SUMMARY

The invention relates to a method, a terminal, a server, a system and a signalling message that are defined in the independent claims. Preferred embodiments of the invention are disclosed in the dependent claims.

In a general aspect, implementations may include using a new parameter in an invitation, or in a request to establish a group communication, sent by a first member joining a group session, the parameter indicating that this invitation is not targeted to the whole group, and in response to the indication, the server hosting the group, or otherwise taking care of sending invitations, does not trigger sending invitations to all group members, but invites a specifically defined group of participants.

BRIEF DESCRIPTION OF THE DRAWINGS

In the following, embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any user terminal, server, corresponding component, and/or to any communication system or any combination of different communication systems that support group communication with pre-arranged groups. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

The term "pre-arranged group" herein covers all groups having at least predefined group members, who can be invited to join a group communication, below also called a session. The term "group communication" herein covers all communication, including any kind of conferencing and conferences, said communication involving use of an entity, such as a server, that maintains information on participants of the communication. Such group communication may include data calls, audio calls, video calls, multimedia calls, messaging, electronic mail, etc. and it may be one-to-one communication within a group or one-to-many communication, or many-to-many, or many-to-one communication. Examples of service applications providing such group communication include PoC, conferencing, and different messaging applications.

In the following, different embodiments will be described using, as an example of a system architecture whereto the embodiments may be applied, an architecture based on SIP providing a tool to build a multimedia architecture and utilizing XDM (XML Document Management) without restricting the embodiment to such an architecture, however. SIP is an Internet Engineering Task Force (IETF) defined application-layer control (signaling) protocol for creating, modifying, and terminating sessions with one or more participants. Open Mobile Alliance (OMA) has defined XDM as a generic framework for group and list management based on XCAP protocol (XML Configuration Access Protocol). IETF specifications and Internet Drafts can be found at http://www.ietf.org, and OMA specifications at http://www.openmobilealliance.org.

Figure 1:
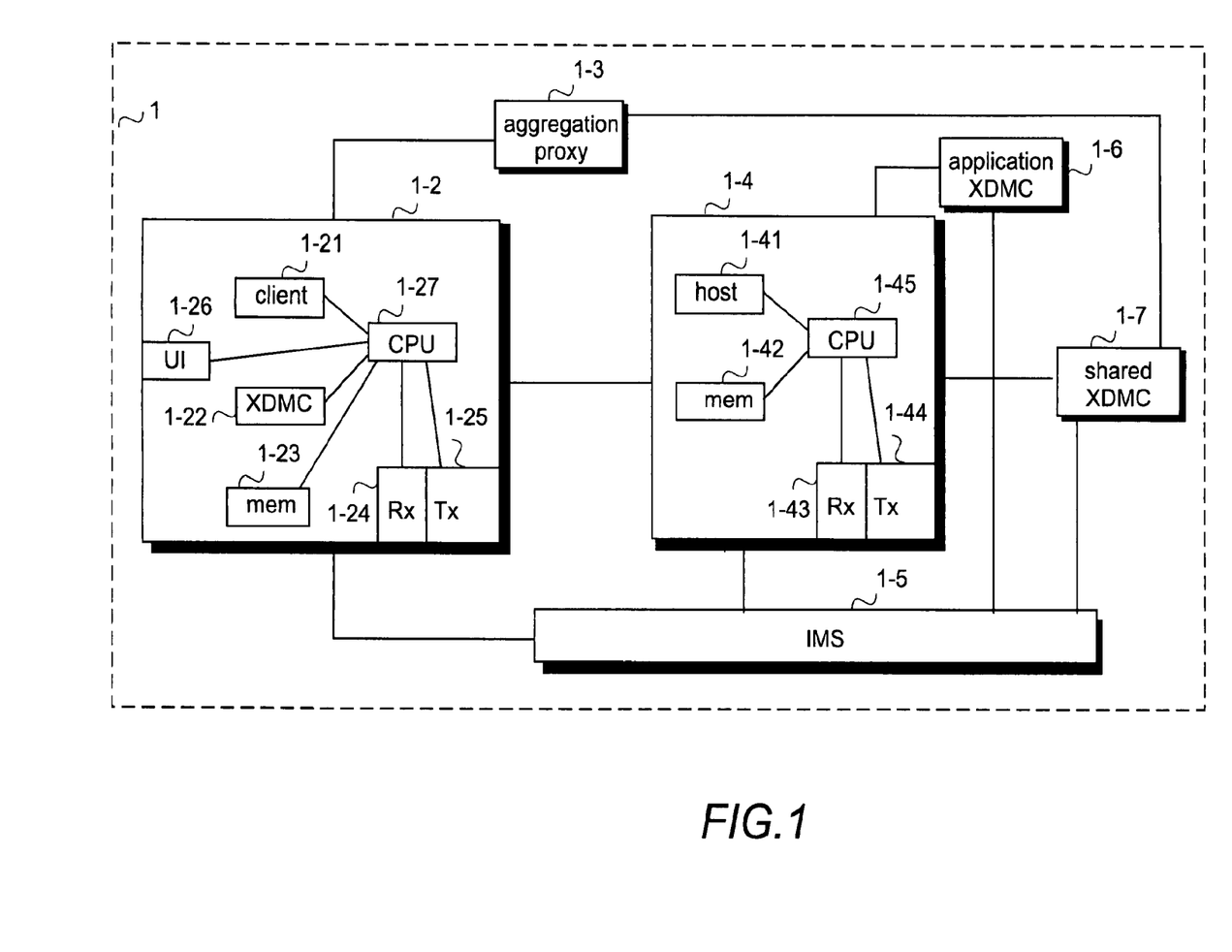
FIG. 1 illustrates an example of a general architecture of a communication system providing a group communication service.

A general architecture of a communication system providing a group communication service utilizing SIP and XCAP is illustrated in FIG. 1. FIG. 1 is a simplified system architecture only showing some elements and functional entities, all being logical units whose implementation may differ from that being shown. The connections shown in FIG. 1 are logical connections; the actual physical connections may be different. It is apparent to a person skilled in the art that the systems also comprise other functions, interfaces, and structures. It should be appreciated that the functions, interfaces, structures, elements and protocols used in or for group communication are irrelevant to the actual invention. Therefore, they need not be discussed in more detail herein.

The communication system 1 comprises a user terminal (UT) 1-2, such as a mobile station, which is connectable to other apparatuses, such as an aggregation proxy 1-3, an application server 1-4, and to an IP Multimedia Subsystem (IMS) 1-5, and via them to an application XML Document Management Server (XDMS) 1-6, and a shared XDMS 1-7.

FIG. 1 illustrates a simplified block diagram of an apparatus 1-2 configured as a user terminal according to an embodiment of the invention and which is called a user terminal. The user terminal 1-2 comprises one or more application client units (client) 1-21 according to an embodiment of the invention, called an application client below, one or more document management client units (XDMC) 1-22, memory (mem) 1-23, a receiver (Rx) 1-24 for receiving and a transmitter (Tx) 1-25 for sending communications (messages), a user interface (UI) 1-26 for receiving user instructions, including selections etc., and for providing information to a user, and one or more operation processors 1-27 for processing one or more application clients and document management clients, for processing and controlling receiving and sending communications, for processing and controlling receiving user instructions and proving information to a user via the user interface 1-26 and for controlling use of the memory. It is apparent to a person skilled in the art that the user terminal may comprise other components, entities, functions and structures that need not be described in detail herein.

As functional entities, the user terminal 1-2 contains an application client 1-21 with which the service provided by the application is accessed, and an XML Document Management Client (XDMC) 1-22 with which XML documents, or an element/elements within an XML document, may be created, deleted, modified and retrieved, for example. The user terminal 1-2, or more specifically, the application client 1-21, allows, among other things, application session initiations and provides access to different group lists and contact lists. The application client according to an embodiment or the user terminal in which the application client resides may be configured to, as illustrated in FIGS. 2 to 5, add a parameter indicating that this invitation requesting establishment of a group communication relating to a pre-arranged group is not targeted to the whole group when joining a group and, depending on the embodiment, either to send to a server hosting the group instruction to invite a specifically defined group of participants, for example, only some of the members, or to send invitations to the specifically defined group of participants. Below, the invitation requesting establishment of a group communication relating to a pre-arranged group is called, for the sake of simplicity, an invitation request. The application client according to an embodiment 1-21 may be shipped with the user terminal, or it may be a downloadable plug-in to the user terminal, otherwise later added to the user terminal, or an application client in the user terminal may be modified to be an application client according to an embodiment.

In other words, the user terminals and/or other corresponding devices or apparatuses implementing the functionality of an embodiment comprise not only prior art means, such as sending means and receiving means, but also means for inviting a specifically defined group of participants in a group communication in a manner to be described below, said means comprising at least means for adding to an invitation request a parameter indicating that the invitation request is not intended for all members of the group. More precisely, they comprise means for implementing an embodiment and they may comprise separate means for each step, or means may be configured to perform two or more steps. Present user terminals comprise processors and memory that can be utilized in the functions according to an embodiment. For example, the application client may be a software application, or a module, or a unit configured as arithmetic operation, or as a program, executed by an operation processor. All modifications and configurations required for implementing an embodiment may be performed as routines, which may be implemented as added or updated software routines, application circuits (ASIC) and/or programmable circuits. Software routines, also called program products, including applets and macros, can be stored in any device-readable data storage medium and they include program instructions to perform particular tasks. Software routines may be downloaded into a device (user terminal). The user terminal, corresponding user terminal component and/or another corresponding device may be configured as a computer including at least a memory for providing storage area used for arithmetic operation and an operation processor for executing the arithmetic operation. An example of the operation processor includes a central processing unit. The memory may be removable memory detachably connected to the user terminal.

The aggregation proxy 1-3, application XDMS 1-6 and shared XDMS 1-7 are XDM functional entities. XDM defines a common mechanism that makes user-specific service-related information, such as group definitions, accessible to different applications (service enablers) and clients residing in a user terminal, and enables creation, modification, retrieval and deletion of such information. The information, more precisely, XML documents, are stored in XDMSs. The application XDMS 1-6 is an application-specific server, i.e. it serves one or more application servers, each for the same particular application, whereas the shared XDMS 1-7 serves application servers for different applications in the system and contains generic group and list management data. The aggregation proxy 1-3 routes an individual XCAP request from the XDMC to the correct XDMS.

The application server 1-4 provides group communication service according to an application. The application providing the group communication service may be PoC, messaging, or conferencing, for example. PoC specification is currently being developed by a PoC working group under OMA. More detailed information on the PoC can be found via the above-mentioned Internet pages of OMA. SIMPLE, defined by IETF, provides instant messaging (IM) service. OMA also defines an IM (Instant Messaging) enabler based on SIP/SIMPLE protocols. Thus, the application server 1-4 may be, for example, a PoC server, an instant messaging server, or a conference server that supports pre-arranged groups. Since the application XDMS 1-6 serves a single application, the application XDMS 1-6 may be, for example, a PoC XDMS or instant messaging XDMS. When the application is, for example, PoC, contact lists may be stored in the shared XDMS 1-7 and/or in the PoC XDMS, i.e. application XDMS 1-6, which contains PoC group documents. A PoC group document providing a member list for a PoC group session, and other predefined features, such as supported communication modes for the group, access policies for the group, and supported media types, for example, is thus accessible to a user terminal 1-2 and to a PoC server, i.e. the application server 1-4, and they can utilize the document when establishing a group session.

FIG. 1 illustrates a simplified block diagram of an apparatus 1-4 configured as an application server according to an embodiment of the invention, which is called an application server. The application server 1-4 comprises one or more pre-arranged host units (host) 1-41 according to an embodiment of the invention, called a pre-arranged host below, memory (mem) 1-42, a receiver (Rx) 1-43 for receiving and a transmitter (Tx) 1-44 for sending communications (messages) and one or more operation processors 1-45 for processing one or more pre-arranged hosts, for processing and controlling receiving and sending communications and for controlling the use of the memory. It is apparent to a person skilled in the art that the server may comprise other components, entities, functions and structures that need not be described in detail herein.

An application server 1-4, below called a server, or more specifically, the pre-arranged host 1-41, allows, among other things, application session initiations and group member invitations. The pre-arranged host according to an embodiment or the server in which the pre-arranged host resides may be configured not to trigger inviting all group members in response to a corresponding parameter in an invitation request but to invite and/or allow invitations of a specifically defined group of participants instead of the whole pre-arranged group, as illustrated in FIGS. 6 to 9. The pre-arranged host 1-41 according to an embodiment may be shipped with a server, or it may be a downloadable plug-in to the server, otherwise later added to the server, or a pre-arranged host in the server may be modified to be a pre-arranged host according to an embodiment.

In other words, an apparatus configured to be a server or a corresponding server component and/or another corresponding device implementing the functionality of an embodiment comprises not only prior art means, such as sending means and receiving means, but also means for detecting a parameter in an invitation request, the parameter indicating that the invitation request is targeted to a specifically defined group, and means for inactivating inviting means in response to the parameter, the inviting means triggering inviting all group members. More precisely, they comprise means for implementing an embodiment and they may comprise separate means for each step, or means may be configured to perform two or more steps. Present servers, corresponding server components and/or other corresponding devices comprise processors and memory that can be utilized in the functions according to an embodiment. For example, the pre-arranged host may be a software application, or a module, or a unit configured as arithmetic operation, or as a program, executed by the operation processor. All modifications and configurations required for implementing an embodiment may be performed as routines, which may be implemented as added or updated software routines, application circuits (ASIC) and/or programmable circuits. Software routines, also called program products, including applets and macros, can be stored in any device-readable data storage medium and they include program instructions to perform particular tasks. Software routines may be downloaded into a device (server). The server, a corresponding server component and/or another corresponding device may be configured as a computer including at least a memory for providing storage area used for arithmetic operation and an operation processor for executing the arithmetic operation. An example of the operation processor includes a central processing unit.

In the following, different embodiments are described using "no-expl" as an example of the parameter without restricting the invention thereto. It is obvious to one skilled in the art that the parameter may be in any format and have any name and may be located anywhere in the invitation request e.g. in an existing or new header or header field, in a message body, in an existing or new header or URI parameter, or in any other existing or new parameter or information element of the request. Further, the parameter may be a new session type value, for example "no-explode", which may be combined with a "pre-arranged" session type value, to form a new session type, for example "pre-arranged-no-explode". In this context, a subscriber who is specifically to be invited to defined group communication is called a participant. A participant may thus refer to an originator who is inviting others to join the group and/or to the invited subscribers. However, the originator does not necessarily need to be a participant. For example, group communication may be originated by an application that does not participate in the actual group communication. In other words, the number of participants may be zero, one, two, three, etc. How the participants are given bears no significance to the invention and therefore it is not described in detail herein since there are several alternatives considered as commonly known to persons skilled in the art. Further, future alternatives may be used with the embodiments.

Another assumption made here is that URIs (uniform resource identifiers) are used as identifiers, without restricting the embodiment to such a solution.

A further assumption made below is that group communication, or a conference, is every time hosted by a server hosting the group, without restricting the embodiment to such a solution. For example, the server hosting the group or receiving the invitation may delegate the hosting of a group session to another server. However, the same server every time hosting group communication of a group, even among specifically defined subgroups of the group, facilitates charging, control and other functionalities.

In the following, only the invitation phase is described since the continuation, i.e. how participants answer to invitations and how the session establishment and/or group communication continues, bears no significance to the invention and is therefore not described herein.

FIGS. 2 to 5 illustrate different embodiments of a user terminal, or more precisely, different embodiments of a client in a user terminal. However, for the sake of clarity, the term "user terminal" is used in the following. In the embodiments illustrated in FIGS. 2 to 4, a pre-arranged group session is established in sub-phases: establishing a session with a server and inviting participants.

Figure 2:
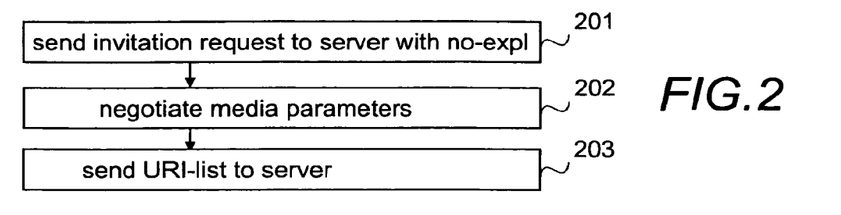
FIGS. 2 to 5 are flowcharts illustrating different embodiments of a user terminal.

FIG. 2 starts when a user of a user terminal wishes to have, either immediately or after a while, group communication using the characteristics of a pre-arranged group X, but among a specifically defined group of participants. In the embodiment illustrated in FIG. 2, the specifically defined group of participants is a subgroup of members of group X. However, as will be discussed below, the specifically defined group may also comprise subscribers who are not members of the pre-arranged group. The user terminal sends, in step 201, an invitation request to join the group X to the server hosting the group X, the invitation request containing the parameter "no-expl" and having as its target address a URI of the group X. The invitation request may be a SIP INVITE. Then the user terminal may negotiate, in step 202, media parameters, etc. within the group definitions of the group X with the server, not described in detail herein. After the negotiations are over, the user terminal has a group communication, i.e. pre-arranged session, with the server.

When the user wishes to start group communication with certain group members of group X, the user may give user terminal information on the intended participants to the group communication, hereinafter called as participant indication. The participant indication can be given explicitly, or selected from/as a list stored in the user terminal, in a server or in a separate database accessible for the purpose. In the user terminal the list may be stored, for example, in a fixed memory module or in a removably attached memory module (for example, UMTS subscriber identity module (USIM), IM services identity module (ISIM), UMTS IC card (UICC), or subscriber identity module (SIM)). For example, the user with the user terminal may retrieve a list of the members of the group X from a server storing group member list information, and use a user interface, such as a screen and a keypad, to pick the participants. The user may perform the selection when triggering the establishment of the pre-arranged session, or at a later stage. The participant indication may be any kind of combination from the list(s) given by the user and/or of list(s) stored in the user terminal(s), in one or more USIM/ISIM/UICC/SIM, in any server(s), in any database(s) or the like, or given/stored by other means.

In response to receiving the information on participants, or if the information is given prior to the establishment of the pre-arranged session, in response to the establishment of the pre-arranged session, the user terminal invites subgroup members by sending, in step 203, the participant indication to the server so that the participants can be invited to the group communication by the server. The participant indication may be sent in SIP REFER message, in a Refer-To header, or in the message body, for example.

Figure 3:
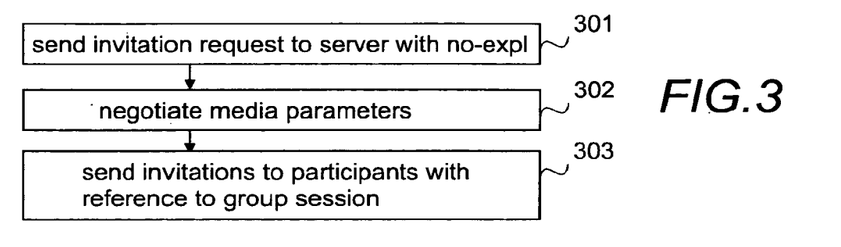

Referring to FIG. 3, the embodiment illustrated herein differs from the embodiment illustrated in FIG. 2 in the way in which the participants are invited. Therefore, steps 301 and 302 for forming the pre-arranged session are similar to steps 201 and 202 and are thus not repeated here in vain. In the embodiment illustrated in FIG. 3, the user terminal sends, in step 303, invitations to participants, i.e. an invitation to each participant specifically defined to be included in the group communication, said invitation containing a reference to the pre-arranged group session. Such an invitation sent to each participant may be for example a SIP REFER request including the URI of the pre-arranged group session in Refer-To header.

Figure 4:
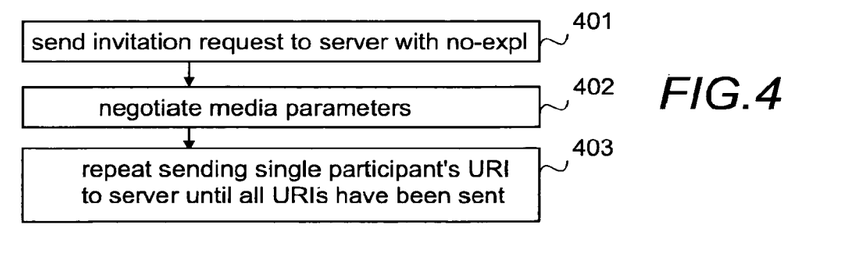

FIG. 4 illustrates an embodiment which comprises a further alternative as to how to invite participants after the pre-arranged session has been established. In other words, steps 401 and 402 in FIG. 4 for forming the pre-arranged session are similar to steps 201 and 202 and are thus not repeated herein in vain. In the embodiment of FIG. 4, a user terminal sends, in step 403, a participant indication indicating one or more participant(s) to the server, so that the participant(s) can be invited to the group communication by the server. The participant indication may be sent in a SIP REFER message, in Refer-To header or in the message body, for example. The user terminal keeps sending of participant indications until all participants have been sent an invitation.

In a further embodiment, the user terminal uses the embodiment of FIG. 2 at the beginning and the embodiment of FIG. 4 when the user wishes to add a further participant or participants to the group communication.

Figure 5:
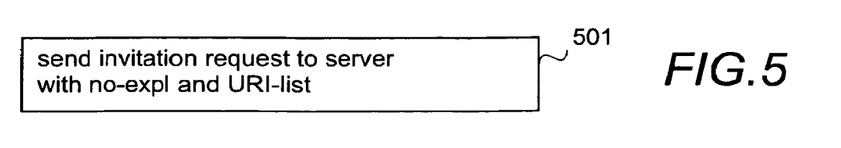

FIG. 5 illustrates an embodiment in which a session is established and participants are invited in one phase, i.e. without pre-establishing a session for group communication of a specifically defined group of participants. FIG. 5 starts when a user of the user terminal wishes to have group communication with a specifically defined group using the characteristics of a pre-arranged group X. The user terminal sends, in step 501, an invitation request to join the group X to the server hosting the group X, the invitation request containing the parameter "no-expl" and having as its target address a URI of the group X, and, furthermore, a participant indication comprising, for example, URIs for each intended participant or reference(s) to URI-list(s) of one or more intended participant(s), so that the participants can be invited to the group communication by the server. The invitation request may be a SIP INVITE with the participant indication, in an existing or new header, or in the message body, for example.

A further embodiment is to utilize the solution of the embodiments of FIGS. 2 to 5 with a pre-established session or with a pre-arranged session established between the user terminal and the server without the no-expl parameter.

Figure 6:
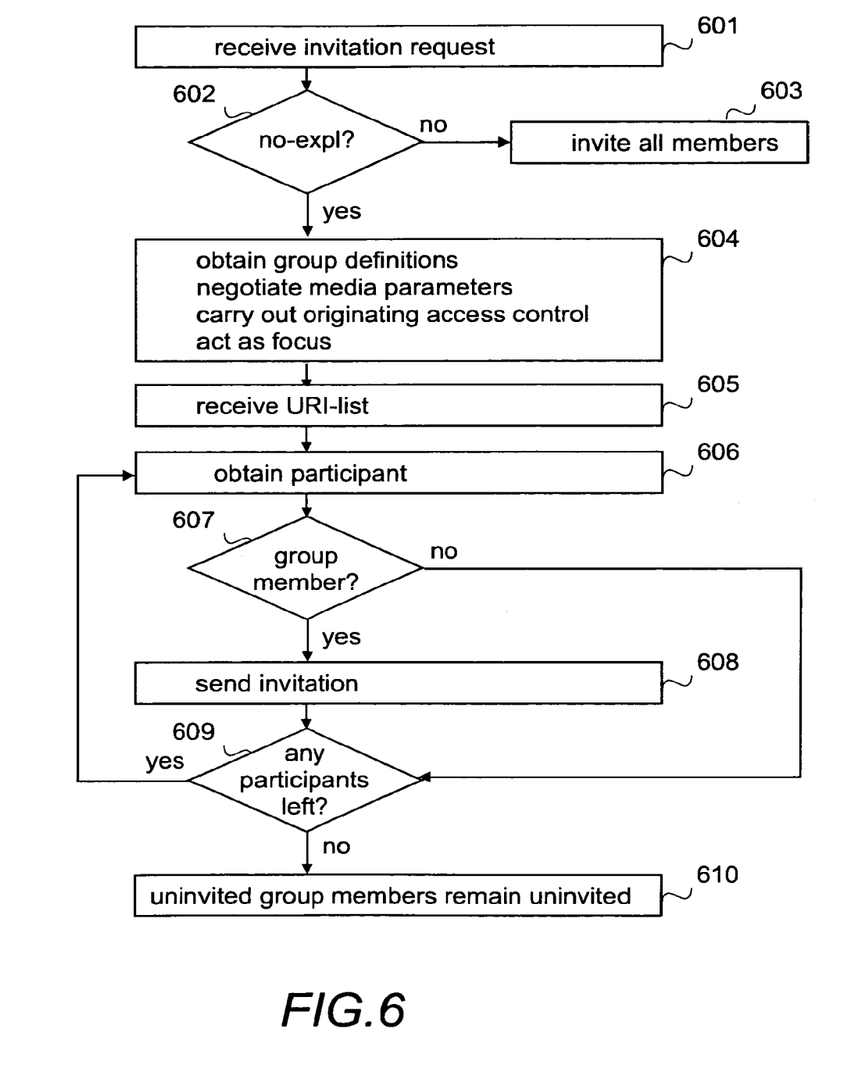
FIGS. 6 to 9 are flowcharts illustrating different embodiments of a server.
Figure 7:
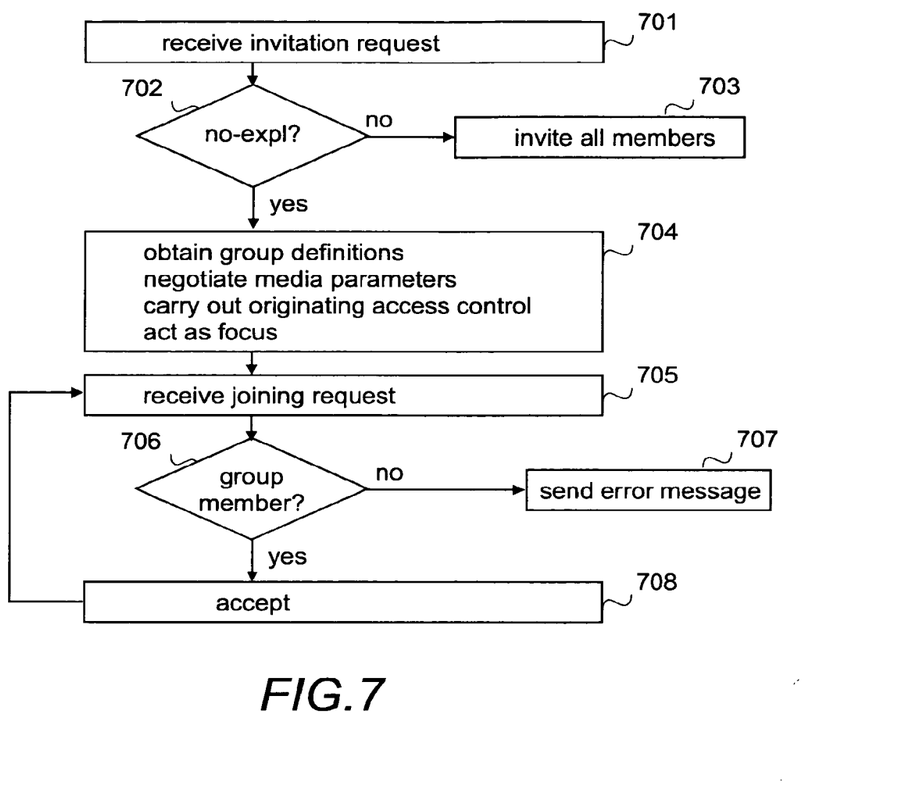
Figure 8:
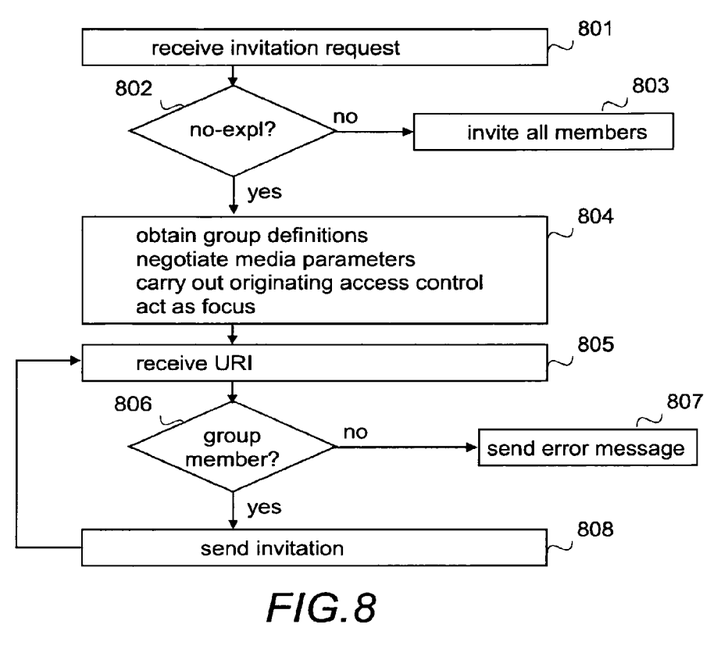

FIGS. 6 to 9 illustrate different embodiments of a server hosting a group, or more precisely, different embodiments of a pre-arranged host in a server. However, for the sake of clarity, the term "server" is used below. The embodiments are illustrated in FIGS. 6, 7 and 8 using a pre-arranged session that contains two different sub-phases: establishing a session with a server and inviting the participants.

Referring to FIG. 6, a server receives, in step 601, an invitation request relating to a group X it is hosting, said invitation request indicating that a first member wishes to join the group X. The invitation request may be a SIP INVITE request, for example. In response to the invitation request, the server checks, in step 602, whether or not the invitation request contains a "no-expl" parameter. If there is no "no-expl" parameter, the server continues, in step 603, according to the prior art, i.e. a session is formed and all group members are invited. If the session to be established is a pre-arranged session, all group members are invited.

If the invitation request contains a "no-expl" parameter (step 602), the server recognizes that this invitation request is for a pre-arranged session for group communication to which a specifically defined group of participants, for example, only some of the group members, is to be invited. Therefore, in step 604, the server only obtains group definitions of the group X, negotiates some media parameters, carries out originating access control, and starts to act as a focus for the group communication. Group communication now exists between the server and the user terminal which sent the invitation request.

The above can be called a first phase. In a second phase, the server receives a participant indication comprising, for example, a URI(s) and/or URI-list(s) and/or reference(s) to URI-list(s) for the group communication. The participant indication may be received in a SIP REFER message, for example. In the embodiment of FIG. 6, in response to receiving the participant indication (step 605), the server, in step 606, obtains a participant's URI from the participant indication and checks, in step 607, whether or not the participant is a group member. If the participant is a group member, the server sends, in step 608, an invitation to the participant. The invitation may be a SIP INVITE, for example. Then the server checks, in step 609, whether or not all participants in participant indication are invited. If not, the server proceeds to step 606 to obtain a participant's URI from the participant indication, and continues therefrom.

If the participant is not a group member (step 607), the server ignores the participant, and continues from step 609 by checking whether or not all participants in the participant indication are invited.

After all participants in the participant indication have been invited, or ignored (step 609), the server has not invited group members who were not included in the participant indication, and they remain uninvited (step 610), unless a new participant indication is received. Depending on the implementation, the server may, in step 610, send an error message indicating to the inviting group member such participant(s) in the URI-list, that were not group members.

In another embodiment, the server first checks whether or not all participants are group members, and if they are, sends the invitations, but if one or more of the participants is not a group member, the server does not invite any participant but sends an error message to the inviting group member.

In one embodiment, the server sends the invitations to all indicated participants, but if one or more of the participants is not a group member, the server may send an error message to the inviting group member.

In one embodiment, the server sends the invitations to all indicated participants without checking whether or not a participant is a group member, i.e. skips step 607 and moves from step 606 to step 608 directly.

Referring to FIG. 7, the embodiment illustrated differs from the embodiment illustrated in FIG. 6 in the way in which the group of specifically defined participants are invited. Therefore steps 701, 702, and 703 are similar to steps 601, 602 and 603, and are thus not repeated here in vain. In the embodiment, if the invitation request contained the "no-expl" parameter (step 702), the server recognizes that this invitation request is for a pre-arranged session for group communication in which a specifically defined group of participants is to be invited and that the invitations to the group communication will be sent by the group member who sent the invitation request, i.e. the server does not need to perform any invitation. Therefore, in step 704, the server only obtains group definitions of the group X, negotiates some media parameters, carries out originating access control and starts to act as a focus for the group communication. Group communication now exists between the server and the user terminal which sent the invitation request. In other words, when the negotiation is over, the server continues as if it had invited the group members, although no invitations were sent by the server.

When receiving joining requests (step 705) from participant(s) the server may check (step 706) whether or not a request is received from a member of the group X before it accepts (step 708) the request. The server may be arranged to accept the joining request only if the request is received from a group member and send (step 707) an error message indicating to the inviting group member participant(s) that were not group members. Alternatively, the server may accept joining requests also from participants that are not members of the group X.

Referring to FIG. 8, the embodiment illustrated differs from the embodiment illustrated in FIG. 6 in the way in which the specifically defined participants are invited. Therefore steps 801, 802, 803 and 804 are similar to steps 601, 602, 603 and 604, and are thus not repeated here in vain.

After the pre-arranged session exists, the server receives, in step 805, a participant indication comprising, for example, URI(s) and/or URI-list(s) and/or reference(s) to URI-list(s) for the group communication. The participant indication may be received in a SIP REFER message, for example. In the embodiment of FIG. 8, in response to receiving the participant indication (step 805), the server picks one of the URIs and checks, in step 806, whether or not the participant is a group member, i.e. does the URI belong to a group member. If the participant is a group member, the server sends, in step 807, an invitation to the participant and returns to step 805 to process the next URI in the participant indication. The invitation may be a SIP INVITE, for example. If the participant is not a group member (step 806), the server sends, in step 808, an error message to the inviting group member. In another embodiment, the server may accept invitations also to participants that are not members of the group X.

Figure 9:
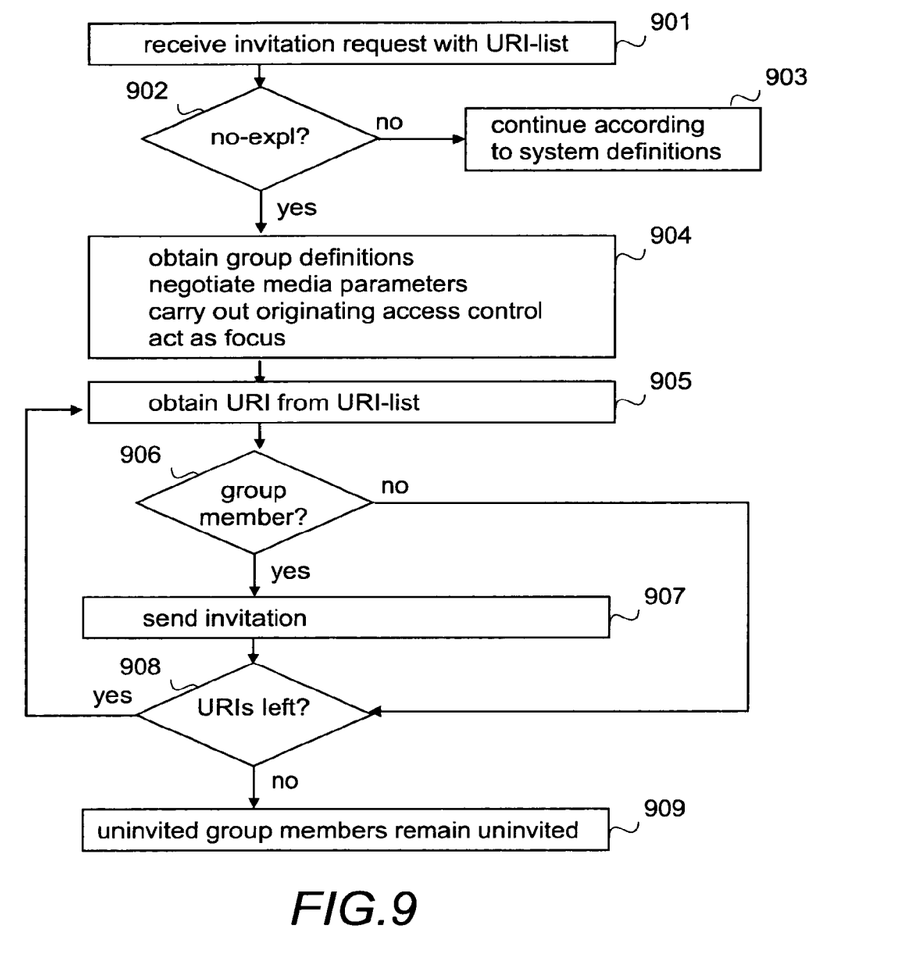

FIG. 9 illustrates an embodiment in which a session is established and participants invited in one phase. A server receives, in step 901, an invitation request relating to a group X it is hosting. The invitation has as its target address a URI of the group X and, furthermore, a participant indication, for example in the form of URI(s) and/or URI-list(s) and/or reference(s) to URI-list(s) comprising URIs for each intended participant. The invitation request may be a SIP INVITE, for example. In response to the invitation request, the server checks, in step 902, whether or not the invitation request contains a "no-expl" parameter. If there is no "no-expl" parameter, the server continues, in step 903, according to system definitions relating to an invitation request having a URI-list. For example, the server may ignore the URI-list, form a session and invite all group members.

If the invitation request contained a "no-expl" parameter (step 902), the server recognizes that this invitation request is for group communication in which a specifically defined group of participants is to be invited. In the embodiment of FIG. 9, this specifically defined group comprises only some of the group members of the pre-arranged group, and therefore the server obtains, in step 904, group definitions of the group X, negotiates some media parameters, carries out originating access control and starts to act as a focus for the group communication.

Preferably at the same time, the server starts to invite the participants. Therefore, in step 905, the server obtains a participant's URI from the participant indication and checks, in step 906, whether or not the participant is a group member. If the participant is a group member, the server sends, in step 907, an invitation to the participant. The invitation may be a SIP INVITE, for example. Then the server checks, in step 908, whether or not all participants in the participant indication are invited. If not, the server proceeds to step 905 to obtain a participant's URI from the participant indication and continues therefrom. In the embodiment of FIG. 9, if the participant is not a group member (step 906), the server ignores the participant, and continues from step 908 by checking whether or not all participants in the URI-list are invited.

After all participants in the participant indication have been invited, or ignored, (step 908), the server has not invited group members who were not in participant indication, and they remain uninvited (step 909), unless a new participant indication is received. Depending on the implementation, the server may, in step 909, send an error message indicating to the inviting group member participant(s) in the participant indication, that were not group members.

In another embodiment, the server first checks whether or not all participants are group members, and if they are, sends the invitations, but if one or more of the participants is not a group member, the server does not invite any participant but sends an error message to the inviting group member.

In another embodiment, the server sends the invitations to the participants, regardless of whether or not they are group members, but if one or more of the participants is not a group member, the server may send an error message to the inviting group member.

In one embodiment, the server sends the invitations to all indicated participants without checking whether or not a participant is a group member, i.e. skips step 906 and moves from step 905 to step 907 directly.

Figure 10:
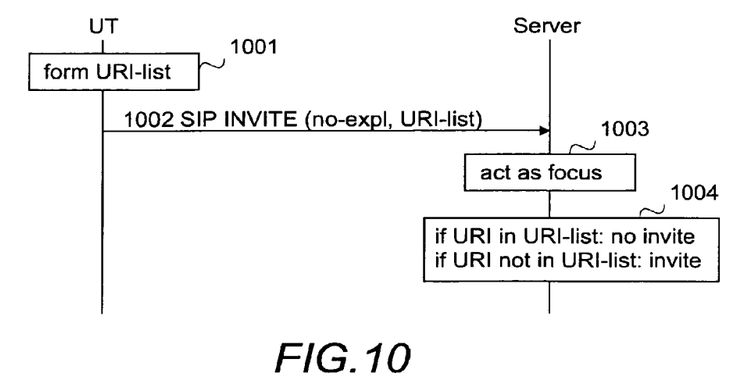
FIG. 10 illustrates signalling according to an embodiment.

Although the embodiments have been described above assuming that the participant indication indicates participants who are invited, it is obvious to one skilled in the art that the embodiments may be implemented such that the URI-list indicates those group members who are not intended participants, i.e. invitations are sent to group members whose URI is not in the participant indication. FIG. 10 illustrates such an embodiment.

FIG. 10 starts when a user of a user terminal wishes to have group communication with a specifically defined group using the characteristics of a pre-arranged group X. In the embodiment of FIG. 10 the specifically defined group corresponds to a subgroup formed by members of the pre-arranged group X not mentioned in a participant indication. Thus, the user of the user terminal selects those members who do not belong to the subgroup, and the terminal forms, in step 1001, a participant indication comprising, for example, URI(s) and/or URI-list(s) and/or reference(s) to URI-list(s) on the basis of the selection. Then the user terminal sends an invitation request 1002 to join the group X to a server hosting the group X, the invitation request 1002 containing the parameter "no-expl", participant indication of members who are not to be invited, and having as its target address a URI of the group X. The invitation request 1002 may be a SIP INVITE message.

In response to receiving the invitation request 1002, the server obtains, in step 1003, group definitions of the group X, negotiates some media parameters, carries out originating access control and starts to act as a focus for the group communication.

Preferably at the same time, the server compares, in step 1004, the participant indication with the group member list. If a group member's URI is not included in the participant indication, the server sends an invitation to a participant (not shown in FIG. 10) but if the group member's URI is included in the participant indication, the server does not invite the group member in question.

The steps, signaling messages and related functions described above in FIGS. 2 to 10 are in no absolute chronological order, and some of the steps may be performed simultaneously or in an order differing from the given one. Other functions can also be executed between the steps or within the steps. Some of the steps or part of the steps can also be left out or replaced by a corresponding step or part of the step. The server operations illustrate a procedure that may be implemented in one or more physical or logical entities. The signaling messages are only exemplary and may even comprise several separate messages for transmitting the same information. In addition, the messages may also contain other information. For example, when another type of group communication is used, or another type of protocol is used, the invitation request is a request according to the type of the group communication or the protocol, such as a message request in messaging.

It will be obvious to a person skilled in the art that as technology advances, the inventive concept can be implemented in various ways. The invention and its embodiments are not limited to the examples described above but may vary within the scope of the claims.

The invention claimed is:

1. An apparatus comprising:
    a communication interface for sending and receiving data;
    a memory for storing instructions to control the apparatus; and
    a processor coupled to the communication interface and the memory, the processor configured to, when executing the instructions stored in the memory, cause the apparatus to:
        form a message comprising a request to establish a group communication to a server hosting a pre-arranged group, the request comprising:
            a predefined uniform resource identifier (URI) that identifies the pre-arranged group, the pre-arranged group comprising a predefined plurality of members at an invitation phase prior to establishing the group communication,
            a parameter indicating that the group communication is intended for a sub-group of the pre-arranged group, the sub-group comprising less than all of the predefined plurality of members, and
            a user-defined list that identifies individual members of the sub-group of the pre-arranged group; and
        send, via the communication interface, the message to the server for inviting the intended sub-group of the pre-arranged group.

2. The apparatus of claim 1, wherein the information on members of the intended sub-group comprises an identifier for each member of the intended sub-group.

3. The apparatus of claim 2, wherein each identifier is a URI.

4. A method comprising:
    forming a message comprising a request to establish a group communication to a server hosting a pre-arranged group, the request comprising:
        a predefined uniform resource identifier (URI) that identifies the pre-arranged group, the pre-arranged group comprising a predefined plurality of members at an invitation phase prior to establishing the group communication,
        a parameter indicating that the group communication is intended for a sub-group of the pre-arranged group, the sub-group comprising less than all of the predefined plurality of members, and
a user-defined list that identifies individual members of the sub-group of the pre-arranged group; and
sending the message to the server for inviting the sub-group of the pre-arranged group.

5. The method of claim 4, wherein the information on members of the intended sub-group comprises an identifier for each member of the intended sub-group.

6. The method of claim 5, wherein each identifier is a URI.

7. A server comprising:
a communication interface for sending and receiving data;
a memory configured to maintain information relating to at least one pre-arranged group, wherein each pre-arranged group comprises a predefined plurality of members at an invitation phase prior to establishing the group communication and corresponds to a predefined uniform resource identifier (URI); and
a processor coupled to the communication interface and the memory, the processor configured to, when executing the instructions stored in the memory, cause the server to:
receive, in a message via the communication interface, a request to establish group communication related to a pre-arranged group via a corresponding predefined uniform resource identifier, the request comprising the URI that corresponds to the pre-arranged group;
determine whether a parameter is included in the request, the parameter indicating that the group communication is intended for a sub-group of the pre-arranged group, the sub-group comprising less than all of the predefined plurality of members; and
in response to determining that the request includes the parameter, establish a session for the group communication related to the pre-arranged group and inviting the intended sub-group of the pre-arranged group, the sub-group comprising a user-defined list included in the request when the parameter is also included in the request and that identifies individual members of the pre-arranged group.

8. The apparatus of claim 7, wherein when inviting the intended sub-group of the pre-arranged group, the processor further causes the server to:
obtain information on members of the intended sub-group;
send, via the communication interface, an invitation to each member of the intended sub-group that is verified to be included in the pre-arranged group.

9. The apparatus of claim 8, wherein the processor, when executing the instructions stored in the memory, further causes the server to:
for each member of the intended sub-group, compare the information of the each member with the predefined plurality of members of the pre-arranged group.

10. The apparatus of claim 7, wherein information on members of the intended sub-group comprises an identifier for each member of the intended sub-group.

11. The apparatus of claim 10, wherein each identifier is a URI.

12. A method comprising:
receiving, at a server, a message comprising a request to establish group communication related to a pre-arranged group, the request comprising a predefined uniform resource identifier (URI) that corresponds to the pre-arranged group, wherein the pre-arranged group comprises a predefined plurality of members at an invitation phase prior to establishing the group communication and corresponds to the predefined URI;
determining, at the server, whether a parameter is included in the request, the parameter indicating that the group communication is intended for a sub-group of the pre-arranged group, the sub-group comprising less than all of the predefined plurality of members; and
in response to determining that the request includes the parameter, establishing a session for the group communication related to the pre-arranged group and inviting the intended sub-group of the pre-arranged group, the sub-group comprising a user-defined list included in the request when the parameter is also included in the request and that identifies individual members of the pre-arranged group.

13. The method of claim 12, wherein inviting the intended sub-group of the pre-arranged group comprises:
obtaining information on members of the intended sub-group;
sending an invitation to each member of the intended sub-group that is verified to be included in the pre-arranged group.

14. The method of claim 13, further comprising:
for each member of the intended sub-group, compare the information of the each member with the predefined plurality of members of the pre-arranged group.

15. The method of claim 12, wherein information on members of the intended sub-group comprises an identifier for each member of the intended sub-group.

16. The method of claim 12, wherein each identifier is a URI.

* * * * *